Patented Dec. 5, 1944

2,364,390

UNITED STATES PATENT OFFICE 2,364,390

METHOD FOR REMOVING MERCAPTAN SULPHUR FROM PETROLEUM DISTILLATE

Jan G. Schaafsma, Pasadena, Calif., assignor to Socony-Vacuum Oil Company, Incorporated, New York, N. Y., a corporation of New York No Drawing. Application May 25, 1942, Serial No. 444,494

2 Claims. (Cl. 196—28)

The object of the invention is to provide a method for removing a portion of the sulphur from sulphur-containing petroleum distillates by treatment in the vapor phase with solid alkali-earth metal hydroxides.

It is known that the mercaptans (alkyl hydrosulphids) which occur in the lighter distillates from many sulphur-containing petroleums are reactive with the alkali-earth metal hydroxides to form the sulphid of the metal and the hydrocarbon corresponding to the alkyl radical of the mercaptan.

The attempts heretofore made to utilize this reaction for the commercial removal of mercaptans from light petroleum distillates (the operation known as "sweetening") have taken the form of adding the oxide or the hydroxide to the liquid undergoing distillation in batch or tube stills. This addition, while useful in combating some types of corrosion of equipment, has proven wholly ineffective as a means for reducing the sulphur content of the distillates produced, or of obtaining a sweet distillate. Even at temperatures from 750° to 900° Fahr. there is substantially no conversion of mercaptan sulphur to metallic sulphid and, consequently, no appreciable reduction in the over-all sulphur content of the distilled product.

I have discovered that the above named reaction, which fails in the liquid phase and in the presence of a large excess of liquid hydrocarbon, may be produced with ease and at high velocity in the vapor phase. I have further discovered that by applying the alkali-earth metal hydroxide to the mercaptan-containing vapors, with the observance of certain limiting conditions which will be described, the mercaptan sulphur content of petroleum distillates of the gasoline type may be almost or completely removed at a very moderate cost for materials, manipulation, and equipment.

The method has the advantage over the conventional oxidizing methods of sweetening that the sulphur contained in the mercaptans is actually removed from the distillate instead of being retained in the form of organic sulphids.

In carrying out the process of the invention I pass the mercaptan-containing vapors through a bed of pulverulent or granulated and at least partially slaked lime at (preferably) superatmospheric pressure and an elevated temperature. "Lime" is hereafter referred to in this description as a type of the alkali-earth metal oxides or hydroxides, as while all of the latter are functional in this process, only the calcium compounds are at present commercially available from the cost standpoint.

The lime must be at least partially hydrated. The effectiveness of the lime for this purpose appears to be a straight line function of the degree of hydration. As parallel experiments using comminuted or granular quicklime (calcium oxide) failed to produce any appreciable result, it may be assumed that only the calcium hydroxide content of a partially slaked lime is utilized. It is therefore most economical on the score of lime consumption to operate with fully hydrated lime (24.3% water) though for facility in preparing the lime bed (an appreciable factor in the total cost of treatment), it may be expedient to use a lime only partially slaked, with some loss in efficiency.

The physical condition of the lime must be such as to permit the vapor stream to pass through the bed with a reasonable pressure drop and without any material carry-over of solids. As complete slaking reduces quicklime to an impalpable powder (at least in part), I have recourse to three alternative methods for forming the material of which the bed is to be composed. The first is to slightly dampen a completely slaked lime and then pelletize it under pressure. The second is to completely slake the lime with enough water to form a paste, dry at say 220° Fahr., crush to the desired size and screen out the fines. Both of these methods yield a completely hydrated product having the maximum efficiency. The third method is to start with the quicklime in granular form, air-slake to a point just short of material break-down of the granules, and separate any dust thus formed. Granular quicklime may be slaked in moist air to about 16% or 17% water without much depreciation of the granular form.

If the hydroxide is to be formed into vapor-permeable beds, it is desirable to use the smallest particle size which is permissible in view of the dimensions of the bed and the predetermined velocity of vapor through it. I have found a suitable size range for average use to be such as will pass through a 10-mesh screen and be retained on a screen having 30 meshes to the linear inch. It will be understood that this is a physical limitation only and that the sole requirement for functionality is contact between the lime particles and the vapor, however it may be produced. I therefore contemplate as functional, though perhaps not commercially practical, methods in which finely comminuted lime is passed over a succession of trays or baffles in counterflow to the vapor or even methods in which the lime powder is dusted down through a slowly ascending vapor column.

In the use of granular lime it is fully equivalent to make use of stationary lime beds which are renewed as they become fouled and inert or to feed fresh lime onto the top of a gradually subsiding bed with continuous or periodical removal of spent lime from the lower end.

The temperature of the lime bed should be maintained within the approximate limits 800° to 900° Fahr. to secure the best results. The removal of mercaptans is accelerated by elevation of temperature and below about 800° Fahr. is likely to be incomplete while above about 900° Fahr. the rate of fouling due to side reactions exceeds the rate of sweetening. The optimum temperature in any specific instance can be determined only by fluctuating the temperature and observing the effects thus produced. It will be found that the process is quite sensitive to temperature control and when the optimum temperature has been found, it should be maintained within a relatively narrow range, not exceeding 25° Fahr.

The pressure carried is not critical but experiments indicate that as the contacting pressure diminishes, the size of the apparatus and the quantity of lime required to produce satisfactory sweetening increase out of proportion with the increase in vapor volume. On the other hand, as pressures increase the strength and the first cost of the apparatus are increased. Thus the optimum operating pressure in any given instance will be determined by offsetting apparatus costs and capacities rather than by any functional limitations. The method may be operated successfully at pressures ranging from atmospheric to at least 100 pounds gauge and probably even higher.

In my observation the fouling of the lime bed is dependent to a far greater extent on the time during which the lime is contacted with vapor than on the quantity of sulphur which it has absorbed. For this reason the most efficient utilization of the lime is promoted by raising the vapor velocity through the bed to the maximum at which a sweet product is realized. In the best practice, however, only a fraction of the total quantity of lime in the bed is actually utilized. As the spent lime contains a considerable proportion of calcium sulphids, it cannot be regenerated by burning and may usually be discarded.

After a given lime bed has become fouled to the point at which it will no longer yield a sweet distillate at the desired vapor velocity, it still retains the ability to react with considerably more mercaptan sulphur. The maximum economy in lime consumption is therefore attained only in the use of a lime bed moving in counterflow to the vapor and of such length that completely spent lime only need be removed from the end at which the vapor enters. An approach to the same effectiveness may be attained in the use of a series of two or more stationary beds, the vapor being passed first through a partially spent bed and then through a bed of relatively fresh lime. In such series the effectiveness increases, at a diminishing rate, as the number of contact beds in series increases. I have obtained good results, to wit a reduction in reagent consumption of 20% to 25% below that obtained in a single chamber, by the use of two chambers in series for the reaction and a third being discharged and recharged.

The treatment of petroleum vapors in the stated temperature range is accompanied by a small amount of cracking, the liquid recovery being of the order of 98% to 99% of the volume charged. The separation of the gas thus produced must be cared for in the condensing arrangements. The polymerization of unsaturates which occurs in the high temperature contacting of petroleum vapors with aluminum oxides and silicates has not been observed when calcium hydroxide is used as the contact solid.

A method of slaking the lime which avoids any operation extraneous to the contactor is to feed the quicklime, in granular form, onto the top of the treating bed and to slake it in situ by means of superheated steam diluted with an inert gas or, better, with sweetened gasoline vapors. In this operation it is necessary to have the lime bed extend above the level of the vapor outlet and to introduce the diluted steam through a distributor which will spread it over the upper surface of the bed and cause it to contact the unslaked lime as completely and evenly as possible. The temperature of the diluted steam should be substantially that of the outflowing sweetened vapor and the dilution of the steam must be so controlled as to produce substantial hydration of the lime without causing it to cake.

The table following sets forth the results of the above described operation when applied to a viscosity-breaker pressure distillate under optimum conditions as to temperature and pressure. The figures in column 1 show the characteristics of the stock charged. Column 2 shows the operating conditions in and the results of a treatment in which a substantially completely slaked lime was used in a single chamber. Column 3 gives similar figures for a treatment using partially slaked lime in a single chamber. Column 4 gives similar figures for a treatment in which partially slaked lime was used in a series of two chambers.

|  | Column No. | | | |
| --- | --- | --- | --- | --- |
|  | 1 | 2 | 3 | 4 |
| Water in lime as charged......percent.. |  | 22.8 | 16.6 | 16.6 |
| Mesh of lime as charged................ |  | 10-28 | 10-28 | 10-28 |
| Number of chambers in series.......... |  | 1 | 1 | 2 |
| Operating temperature.........°Fahr.. |  | 850 | 850 | 850 |
| Operating pressure......pounds gauge.. |  | 30 | 30 | 30 |
| Space velocity [1]..................... |  | 2.02 | 2.01 | ²4.10 |
| Length of run..................hours.. |  | 12 | 12 | 2.75 |
| *Treating agent efficiency* | | | | |
| Barrells raw stock per ton lime as charged............................. |  | 515 | 426 | 522 |
| Pounds CaO per barrel raw stock...... |  | 2.9 | 5.6 | 2.7 |
| *Yields based on raw stock* | | | | |
| Volume liquid product........percent.. |  | 98.5 | 98.0 | 98.0 |
| Gas, H₂S free.....cubic feet per barrel.. |  | 11.3 | 11.0 | 11.3 |
| *Properties stock and product* | | | | |
| Reed vapor pressure..........pounds.. | 9.7 | 10.0 | 10.0 | 10.4 |
| A. P. I. gravity.............degrees.. | 62.7 | 62.8 |  | 62.6 |
| Initial boiling point..............do.... | 91 | 92 | 91 | 87 |
| End point......................do.... | 367 | 373 | 370 | 370 |
| Gums, copper dish.................... | 226 | 364 | 343 | 484 |
| Gums, A. S. T. M..................... | 7 | 6 | 2 | 3 |
| Total sulphur content........percent.. | 0.64 | 0.46 | 0.50 | 0.50 |
| Mercaptan sulphur content......do.... | 0.16 | 0.003 | 0.003 | 0.003 |
| Octane number, motor method......... | 70.5 | 70.7 | 71.0 | 70.7 |
| Octane number, M. M.+1 cc. TEL..... | 73.5 | 74.5 | 75.1 | 74.8 |
| Octane number, M. M.+3 cc. TEL..... | 76.1 | 77.7 | 78.2 | 78.0 |
| Octane number, 1939 research method.. | 78.8 | 79.4 | 79.9 | 79.5 |
| *Net results* | | | | |
| Relation mercaptan sulphur to total sulphur.....................percent.. | .25 | 25 | 25 | 25 |
| Reduction in total sulfur..........do.... |  | 28 | 22 | 22 |
| Octane number increase, M. M., clear.. |  | 0.2 | 0.5 | 0.2 |
| Octane number increase, M. M. 3 cc. TEL............................. |  | 1.6 | 2.1 | 1.9 |

[1] Volume vapor per hour ÷ volume lime.
[2] Figured on volume lime in second (fresh) chamber.

I claim as my invention:

1. The method of removing mercaptan sulphur from petroleum distillate which consists in contacting the vapor of said distillate, at a temperature within the range 800° to 900° Fahr., with a granular reagent consisting substantially solely of calcium oxide and calcium hydroxide.

2. A process for removing mercaptan sulphur from petroleum distillate which consists in passing the vapor of said distillate through a bed consisting substantially solely of partially hydrated calcium oxide in granular form, said bed being maintained at a temperature between 800° and 900° Fahr.; withdrawing spent granules from the side of said bed at which said vapor enters; introducing substantially anhydrous calcium oxide in lump form to the side of said bed at which said vapor emerges, and reducing said lumps to the form of partially hydrated granules by the controlled admission of steam at the side at which said lumps are introduced.

JAN G. SCHAAFSMA.